Dec. 10, 1957 M. E. DONEFF 2,815,963
GUARD FOR DISCS AND THE LIKE
Filed Feb. 7, 1956
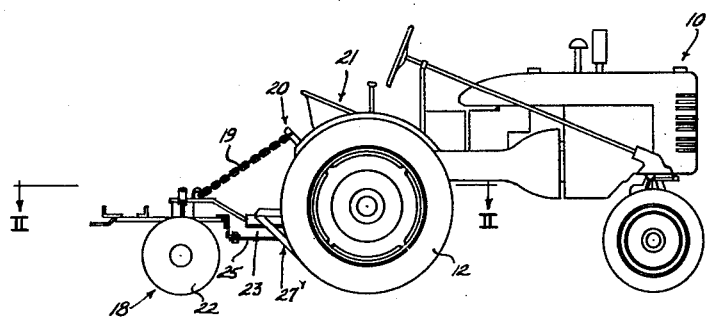
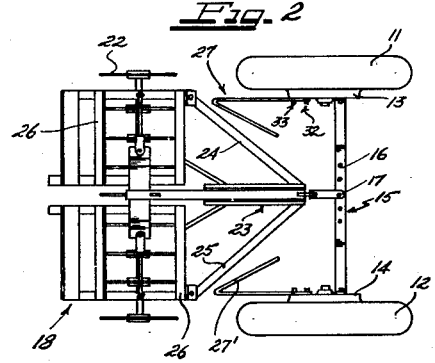
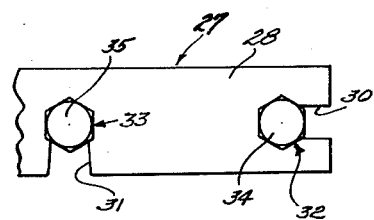
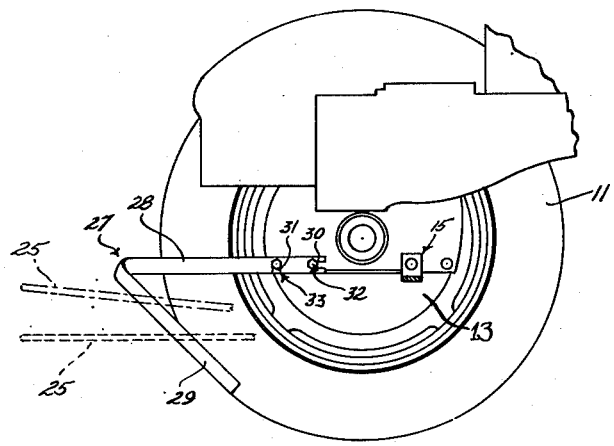
Inventor
MARIN E. DONEFF
by Hill, Sherman, Meroni, Gross + Simpson
Attys.

United States Patent Office 2,815,963
Patented Dec. 10, 1957

2,815,963
GUARD FOR DISCS AND THE LIKE
Marin E. Doneff, Gary, Ind.
Application February 7, 1956, Serial No. 563,973
5 Claims. (Cl. 280—400)

This invention relates generally to a guard for use on a powered vehicle to prevent an independent vehicle being towed behind the powered vehicle from striking rear wheels on the powered vehicle. To this end, preferably, two guards are utilized, one guard in association with each of the rear wheels of the powered vehicle.

One of the principal problems faced by farmers in driving their tractors while pulling a vehicle attachment such as a disk harrow is the ever present possibility that in negotiating turns the vehicle attachment and specifically the disks on the harrow have a tendency to strike the rear wheels of the tractor. When the attached vehicle does strike one of the rear wheels serious damage may be done to the wheel and furthermore steering of the powered vehicle may become impaired as a result causing a safety hazard.

Accordingly, an object of this invention is to provide a guard construction to prevent a vehicle attachment from striking rear wheels of a tractor or the like.

Another object of this invention is to provide a new and improved guard construction.

Yet another object of this invention is to provide guards on a tractor capable of preventing a disk harrow and the like when towed behind the tractor from striking the tractor wheels regardless of whether the harrow is in an elevated or ground engaging position.

A further object of this invention is to provide a guard construction which lends itself to economical manufacture on a large production basis and which may be readily installed and removed from a tractor and the like.

According to the general features of this invention there is provided in a tractor having thereon rear wheel assemblies including spaced rear wheels each having a stationary brake plate provided with longitudinally spaced extensions, a draw bar connected at opposite ends to the brake plates, an independent vehicle attachment comprising a disk harrow behind the vehicle in adjacency with the rear wheels connected to the draw bar, and guards connected to each of the brake plates to prevent the independent vehicle from striking the rear wheels, the guards including spaced notches opening at generally right angles to one another each in engagement with one of the spaced extensions to retain each of the guards in interlocked assembly on one of the brake plates, the disk harrow having manually operable controls to selectively maintain the disk harrow in a ground engaging position and an elevated position with the guards being effective regardless of the position to prevent the harrow from striking the wheels.

Other objects and features of the present invention will more fully become apparent from the following detailed description taken in conjunction with the accompanying drawing illustrating a single embodiment in which:

Figure 1 is a side elevation of a tractor having attached thereto and a disk harrow;

Figure 2 is a fragmentary cross sectional view taken substantially on the line II—II of Figure 1 looking in the direction indicated by the arrows embodying features of the present invention;

Figure 3 is an enlarged detailed view highlighting the inter-relationship of my novel guard with a rear wheel of a tractor; and Figure 4 is an enlarged detail view of my guard locked on wheel extensions.

As shown on the drawing:

The reference numeral 10 indicates generally a more or less conventional tractor construction having rear wheels 11 and 12 respectively with each of the wheels provided with more or less conventional stationary brake plate housing assemblies 13 and 14. Carried between the stationary brake plates 13 and 14 is a draw bar 15 having holes 16 therein to receive a connecting pin 17 which is joined to a conventional disk harrow 18.

The disk harrow 18 is connected by a chain 19 to a conventional hydraulic rock shaft assembly 20 which may be operated from the seat 21 of the tractor to elevate the disk harrow 18 into and out of contact with a ground surface as is desired and conventional. It will be appreciated that when plowing and an end of a row is reached it is customary that the farmer elevate the disk harrow 18 out of contact with the ground surface being plowed until the tractor is placed again in position for subsequent plowing. Still further, when traveling along highways and the like in order to preserve disks 22 of the harrow 18 in the best possible manner it is advisable to maintain the harrow 18 out of contact with a road surface or the like.

The connecting pin 17 is connected to a hitching assembly 23. Extending at divergent angles from the hitching assembly 23 on opposite sides thereof are divergent pivotal supports 24 and 25 which are each connected at their other end to frame 26 (Figure 2) of the disk harrow 18.

According to the general principles of my invention I have provided left and right handed guards 27 and 27'. Both guards are substantially identical with guard 27 including a first generally horizontally extending leg 28 (Figure 3) which is connected at one end to the brake plate 13 and is angled and turned at its other end into a generally forwardly, inwardly and downwardly extending leg 29 (Figure 3). My novel guards 27 and 27' may be made out of steel or any other suitable material.

Provided on leg 28 of guard 27 are spaced notches 30 and 31. Notch 30 is provided at the terminal end of leg 28 and opens in a forward direction relative to the tractor 10 when in assembly therewith. Notch 31 is spaced rearwardly from notch 30 and is open at generally right angles to notch 30 in a vertically downward direction.

Provided on each of the brake plates 13 and 14 are longitudinally spaced extensions 32 and 33.

Since the left handed and right handed guards 27 and 27' may be assembled with respective brake plates 13 and 14 in much the same manner, a description of the assembly of one of the guards will be sufficient for both. Initially, in the assembly of guard 27 on tractor 10, notch 30 is brought into interlocked engagement with extension 32 with the enlarged head 34 of the extension 32 abutting the inner face of the draw bar leg 28 to insure against transverse displacement of same. Thereafter the leg 28 of the draw bar 27 is moved vertically downwardly until the extension 33 is engaged in the notch 31 with the enlarged extension head 35 bearing against the leg 28 to hold the leg 28 in horizontal position, and in conjunction with the beaded extension 32 thereby insuring against transverse displacement of the guard 27.

It will be noted that the extensions 32 and 33 have on their inner terminal ends enlarged heads 34 and 35, respectively.

In the operation of the tractor 10, and after a suitable attachment such as a disk harrow 18 has been connected to draw bar 15 the transversely spaced guards 27 and 27' are adapted to bear against the arms 24 and 25 when the tractor 10 is turned in either a left hand or right hand direction regardless of whether the harrow 18 is in a ground engaging or in an elevated position with respect to the tractor 10. Figure 3 shows the relationship of the support arm 25 of the harrow 18 and the guard 27 when the harrow 18 is in ground engaging and elevated positions.

It will be understood that modifications and variations may be effected without departing from the scope of the novel concepts of the present invention.

I claim as my invention:

1. A vehicle having thereon rear wheel assemblies including spaced rear wheels each having a stationary brake plate provided with longitudinally spaced extensions, means on said vehicle to draw an independent vehicle attachment behind said vehicle in adjacency with said rear wheels, and guards connected to each of said brake plates to prevent said independent vehicle from striking said rear wheels, said guards including spaced notches opening at generally right angles to one another each in engagement with one of said spaced extensions to retain each of said guards in interlocked assembly on one of said brake plates, said guards each including legs one of which is angled generally vertically relative to the other to prevent said independent vehicle attachment from contacting said wheels.

2. A guard mountable on a stationary brake plate housing assembly associated with a rear wheel of a truck tractor or the like to prevent a vehicle being towed by the tractor from swinging into and striking a wheel comprising a first generally rearwardly extending leg for horizontal mounting on said housing assembly, a second leg extending generally forwardly inwardly and downwardly from a rear end of said first leg and means on said first leg cooperable with the stationary brake plate housing assembly to mount said guard on the wheel.

3. A guard mountable on a stationary brake plate housing assembly associated with a rear wheel of a truck tractor or the like to prevent a vehicle being towed by the tractor from swinging into and striking a wheel comprising a first generally horizontal rearwardly extending leg, a second leg extending generally downwardly at an acute angle from a rear end of said first leg and means on said first leg cooperable with spaced lugs on said stationary brake plate housing assembly to carry said guard on the wheel, said means comprising longitudinally spaced notches with one of said notches opening forwardly on a forward end of said first leg, and with another of said notches opening downwardly with each of the notches capable of interlocked cooperation with one of the spaced lugs.

4. In a vehicle having thereon rear wheel assemblies including spaced rear wheels each having a stationary brake plate and means on said vehicle to draw an independent vehicle attachment behind said vehicle in adjacency with said rear wheels, the improvement of guards connected to each of said brake plates to prevent said independent vehicle from striking said rear wheels, mounting means on said guards for assembly with said brake plates, and said guard including angled legs which are joined together with one of said legs extending generally vertically of and at an inclined angle relative to the other of said legs.

5. A tractor having thereon rear wheel assemblies including spaced rear wheels each having stationary brake plates provided with longitudinally spaced extensions, a draw bar connected at opposite ends to said brake plates, an independent vehicle attachment behind said vehicle in adjacency with said rear wheels connected to said draw bar, and guards connected to each of said brake plates to prevent said independent vehicle attachment from striking said rear wheels, said guards having joined legs including a rearwardly extending leg and a vertically inclined leg with said guards having mounting means for attachment to said brake plates, said attachment having manually operable controls to selectively maintain said attachment in a ground engaging position and an elevated position with said guards being effective regardless of the position to prevent said attachment from striking said wheels.

References Cited in the file of this patent
UNITED STATES PATENTS

| | | |
|---|---|---|
| 1,663,250 | Graham | Mar. 20, 1928 |
| 1,898,353 | Everett et al. | Feb. 21, 1933 |
| 2,368,290 | Donald | Jan. 30, 1945 |
| 2,707,424 | Marvin | May 3, 1955 |
| 2,757,591 | Stafford | Aug. 7, 1956 |